United States Patent [19]
Vurek

[11] 3,867,097
[45] Feb. 18, 1975

[54] MEASUREMENT OF CARBON DIOXIDE

[75] Inventor: Gerald G. Vurek, Bethesda, Md.

[73] Assignee: The United States of America as represented by the Secretary of the Department of Health, Education and Welfare, Washington, D.C.

[22] Filed: May 4, 1973

[21] Appl. No.: 357,272

[52] U.S. Cl............ 23/254 E, 23/230 B, 23/232 E, 23/254 R, 73/19, 73/190 R, 128/2
[51] Int. Cl.. G01k 17/00, G01n 25/20, G01n 33/16
[58] Field of Search .......... 23/232 R, 232 E, 254 R, 23/253 R, 230 B, 254 E; 73/19, 190 R

[56] References Cited
UNITED STATES PATENTS

| | | | |
|---|---|---|---|
| 2,687,342 | 8/1954 | Strange | 23/232 E |
| 2,946,665 | 7/1960 | Skeggs | 23/232 R X |
| 3,347,635 | 10/1967 | McKee | 23/232 E |
| 3,518,982 | 7/1970 | Timmins | 23/232 R X |
| 3,558,283 | 1/1971 | Freeman | 23/232 E |
| 3,567,387 | 3/1971 | Jones | 23/232 R |
| 3,578,409 | 5/1971 | Silverman | 23/232 E X |
| 3,694,164 | 9/1972 | Guenther | 23/232 R X |
| 3,716,337 | 2/1973 | Jones | 23/254 R |

Primary Examiner—Morris O. Wolk
Assistant Examiner—Sidney Marantz

[57] ABSTRACT

Apparatus and a method for measuring small amounts of carbon dioxide, utilizing the reaction between carbon dioxide and a basic material such as lithium hydroxide. The apparatus includes a calorimeter containing a differential thermopile, one side of which is in contact with the basic material. A sampling system in fluid communication with the calorimeter provides a carbon dioxide-containing carrier gas to the calorimeter. The apparatus is particularly useful in the measurement of carbon dioxide in blood plasma for diagnostic purposes.

4 Claims, 2 Drawing Figures

MEASUREMENT OF CARBON DIOXIDE

BACKGROUND AND SUMMARY OF THE INVENTION

The measurement of carbon doxide is important in medicine as well as biomedical research. Because carbon dioxide has a great effect on many biochemical processes, the amount of carbon dioxide in the blood is maintained within close limits by persons having healthy respiratory systems, with excess $CO_2$ being excreted principally by the lungs. However, lung injury, disease or situations requiring mechanically assisted respiration during, for example, surgical procedures with general anesthesia, can lead to undesirable fluctuations in blood $CO_2$ levels. Convenient and rapid carbon dioxide measurement thus could permit continuous monitoring of an important blood constituent and help prevent life-endangering conditions.

By the present invention there is provided a sensitive and convenient instrument for the measurement of carbon dioxide. The apparatus of the present invention offers a sensitivity comparable to a mass spectrometer, as well as a facility for continuous measurement which is difficult to achieve with gas chromatography. Because the apparatus of the present invention is sensitive enough to measure nanoliter amounts of carbon dioxide, its sensitivity corresponds to the parts-per-million level in gas samples of a few milliliters of volume.

Thus the present invention offers decided advantages over devices of the prior art such as the "Severinghaus electrode" which uses dilute aqueous bicarbonate buffers which change pH with changes in $pCO_2$. Since such prior art devices generally employ electrolyte volumes on the order of a few microliters, several microliters or more of carbon dioxide must be absorbed and converted to carbonic acid in order for the prior art devices to function properly. Such absorption may require two minutes or more, an excessive amount of time particularly when life-endangering conditions may be present which require instantaneous monitoring and treatment. The measurement device of the present invention, on the other hand, can respond more rapidly than conventional instrumentation, has excellent sensitivity and is a rugged device having no moving parts and with good specific application for the measurement of carbon dioxide. The present apparatus is particularly well adapted for the measurement of carbon dioxide in blood plasma for diagnostic purposes.

The apparatus of the present invention includes a calorimeter constructed of concentric cylinders which form a thermostatic shield enclosing a reaction chamber in which is contained a differential thermopile, one side of which is in contact with a basic material such as granular lithium hydroxide. Heat generated by the reaction of the basic material with carbon dioxide transmitted to the chamber by a carrier gas is detected by the thermopile, generating a voltage which is amplified by a preamplifier mounted at one end of the calorimeter, the voltage then being transmitted to suitable electrical recording apparatus. Associated with the calorimeter is a sampling system for providing the carbon dioxide-containing carrier gas to the calorimeter. There is advantageously included a coulometer to indicate when the alkali should be replenished.

The type of chemical reaction which is utilized in the present invention is as follows:

$$CO_2(g) + 2LiOH \cdot H_2O(s) \rightarrow Li_2CO_3(s) + 3H_2O + 8.96 \times 10^4 \text{ J/mole}$$

Nearly 4 joules are released per milliliter of carbon dioxide reacted with lithium hydroxide. A calorimeter with a sensitivity of $10^{-6}$ watts should have an equivalent sensitivity of 0.25 nanoliters of $CO_2$ per second. 1 gram of LiOH will absorb 0.7 grams (0.37l.) of $CO_2$ so that 20 mg of LiOH will absorb 7.4 ml $CO_2$. A continuous flux of ten nanoliters of $CO_2$ per second, releasing 39 microwatts, will be absorbed by 20 milligrams of LiOH in somewhat more than 1 week. Therefore, in accordance with the present invention, there are employed preassembled absorbers that can be replaced at rather infrequent intervals, determined either by integration of the calorimeter output or routine scheduling.

Referring to the drawings:

FIG. 1 shows a schematic block diagram of the apparatus of the present invention; and FIG. 2 shows a schematic block diagram of an alternative embodiment of the present invention.

DESCRIPTION OF THE PREFERRED EMBODIMENTS

Figure 1:
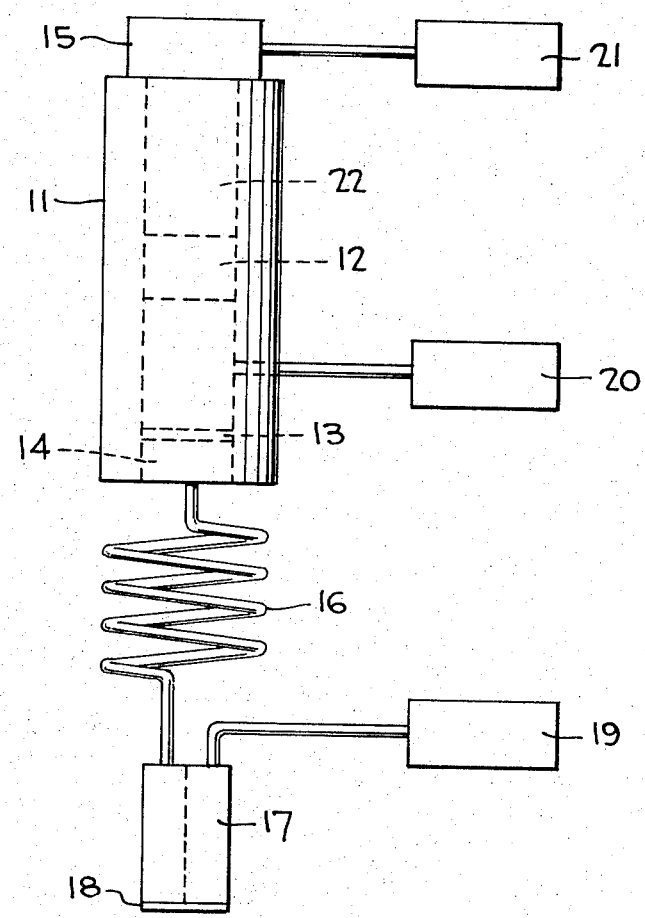

As shown in FIG. 1, the apparatus of the present invention includes a calorimeter 11 which is constructed of concentric cylinders of a metallic material of good heat conductivity such as aluminum to define a thermostatic shield around a reaction chamber 22 in serial arrangement with a thermopile 12. The reaction chamber 22 should be sufficiently small so that the heat of reaction will be transmitted to the thermopile 12 and yet large enough to accommodate the components to be described hereinafter. A calorimeter having a length of about 7 inches and defining a reaction chamber diameter of about 0.75 inch has been employed with good results. The thermopile 12 is preferably a semiconductor-element differential thermopile, mounted in the calorimeter by conventional means, and having one side in thermal contact with a quantity of a basic material which may, for example, be provided as a thin coating on a thin metal disk 13 which is secured to a cap 14. The basic material may be any material of a basic nature which reacts with carbon dioxide to liberate a measurable amount of heat. Suitable basic materials include alkali materials such as lithium hydroxide and sodium hydroxide and also organic amines. The preferred basic materials are those which exist in the solid form at normal temperature. Thus, granular lithium hydroxide has been employed with excellent results. A low-noise solid state preamplifier 15 may be mounted at one end of the calorimeter 11 to minimize lead length and to reduce problems from electrical interference. The sample to be tested travels to the reaction chamber through a helix of capillary tubing 16 at the other end of the calorimeter. Not shown in the drawing is an outer cover of plastic such as phenolic thermosetting plastic or similar material which protects the unit from large thermal and mechanical shocks.

A sampling system 17 is associated with the apparatus, the sampling system 17 including, for example, a double-barrelled tube having two parallel segments with a polymer membrane 18 at one end and connections to the carrier gas source 19 and calorimeter 11 in the respective two segments of the tube at the other end. The two segments of the tube are in fluid communication at the end of the tube adjacent the polymer membrane 18. The polymer membrane 18 is in direct contact with blood or in the respiratory air stream by means such as a direct insertion of the end of the tube containing the membrane 18 into a conduit through which passes the blood or respiratory air stream to be sampled. Carbon dioxide diffuses through the membrane and is transported by the carrier gas to the reaction chamber. Since the carrier flow is much faster than the rate at which the carbon dioxide diffuses across the membrane, and since all the carbon dioxide reacts with the basic material, the instrument is relatively independent of carrier flow rate but responds directly to the flux of carbon dioxide across the membrane. This flux depends upon the partial pressure of the carbon dioxide outside the membrane 18 and also on the properties of the membrane. By employing a low permeability membrane, such as Teflon, the trademark for a tetrafluoroethylene fluorocarbon polymer, the necessity for mechanical agitation of the system is minimized, since the carbon dioxide gradient in the sample is minimal.

The apparatus of the present invention is an instrument designed to measure nanoliter amounts of carbon dioxide. The carbon dioxide gas, which is transported from the sampling region to the calorimeter by a carrier gas such as $CO_2$-free nitrogen or other inert carrier gas, reacts with the basic material releasing an amount of heat which varies depending upon the basic material employed. The heat which is released is sensed by the thermopile 12 which generates a voltage proportional to the rate of reaction. This voltage is transmitted to the preamplifier 15 and then recorded on conventional electrical recording apparatus 21. Since the calorimeter 11 is capable of detecting output levels as low as a few tenths of a microwatt, it can detect as little as 5 nanoliters per second of carbon dioxide with better than 5 percent precision.

Sufficient lithium hydroxide or other basic material is contained in the reaction chamber of the calorimeter 11 to permit the apparatus to operate continuously at normal levels for several days. A coulometer 20 is electrically connected to the output line from the preamplifier 15 to indicate when the basic material should be replenished. By using the Peltier effect, the reaction chamber can be restored to thermal equilibrium rapidly after the chamber is replenished. Thus the period during which the apparatus can be employed at full sensitivity is maximized.

The apparatus and method of the present invention are further exemplified by the following example:

A micro-calorimeter was constructed employing a pair of 16-couple semiconductor Peltier heat pumps as a differential thermopile. The pair of pumps were mounted back to back on an aluminum heat-sink inside a triple cylinder thermal isolator. Sensitivity of the unit was 1 microvolt per 10 microwatts. Short term noise, measured with a Keithley Model 149 voltmeter was determined to be less than $3 \times 10^{-8}$ volt over the frequency band between 0.1 to 1Hz. The $CO_2$ absorbing cell included a thin brass disk lightly coated with powdered LiOH attached to a shallow cap. $CO_2$-free nitrogen was employed as a carrier gas to transport the gas from the sampling zone to the absorber. To check the reproducibility, stability, response time and absorber life of the system, a 15 millimeter length of a silicon copolymer capillary material, such as MEM-213, sold by General Electric Company, was employed, through which passed the carrier gas. The capillary was enclosed in a glass chamber through which passed either nitrogen or a 2.97% $CO_2$-air mixture at a rate of 100 milliliters per minute. The gases were changed every three minutes. No significant change in sensitivity or response time was observed over a period of three days continuous operation. The response was independent of carrier flow rates from below 2 microliters per second to 15 microliters per second. The 10 %–90% rise/fall time was about 100 seconds. The delay time depended on the carrier flow rate because the sample zone was separated from the detector by 25 centimeters of 0.27 mm I.D. Teflon tubing. Test runs with two different absorbers produced comparable results.

In an alternative embodiment, a pair of temperature-sensitive resistors (thermistors) are employed as two arms of a Wheatstone bridge. A single grain of lithium hydroxide is placed on one thermistor and the introduction of carbon dioxide into the chamber causes the liberation of heat which changes the resistance of that thermistor. The bridge unbalance may be detected by a sensitive amplifier and the degree of unbalance is proportional to the amount of carbon dioxide present. This thermistor unit has been used to measure the total acid-releasable $CO_2$ contained in approximately 8 nanoliters of sample. Such a sample size is typical of that obtained by micropuncture techniques used by researchers investigating the function of individual kidney tubules. In this application, a stream of carrier gas such an nitrogen is passed over a drop of non-volatile acid such as sulfuric or phosphoric acid. The 8 nanoliter sample was injected into the drop and the carbon dioxide in the sample, including that from bicarbonate ion, was released by the acid into the carrier. A transient rise in temperature of the LiOH occurred which was measured and recorded. The sensitivity of the system was estimated to be 4 picomoles of $CO_2$. This alternative embodiment is shown in FIG. 2.

Figure 2:
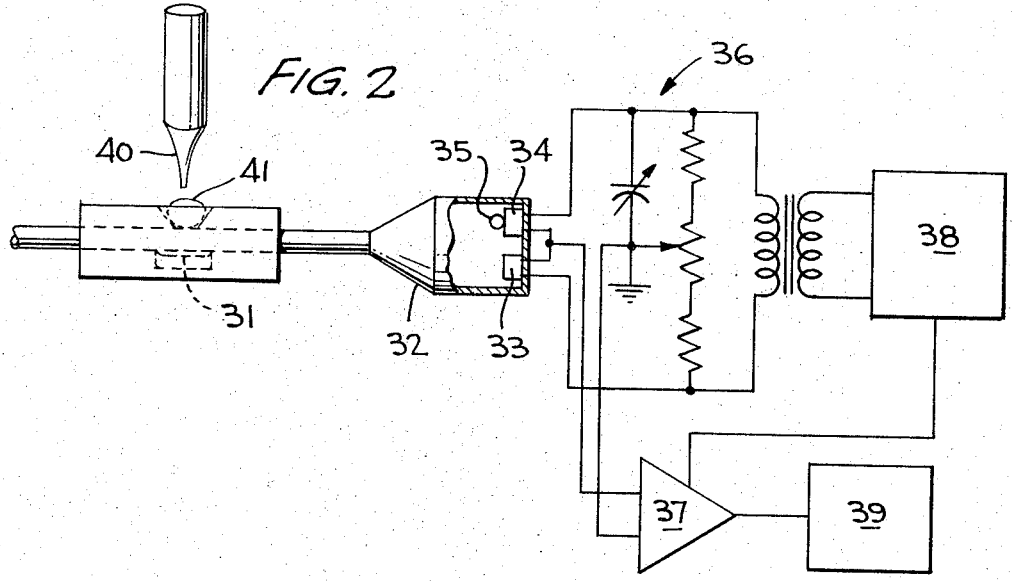

Referring to FIG. 2, the carrier gas passes over an acid drop 31 to the reaction chamber 32. Two thermistors 33, 34 are employed, one of which has a grain 35 of LiOH affixed. The thermistors are connected in a bridge-form with a balancing network 36 and phase-sensitive detector-amplifier 37. The output of the oscillator 38 excites the bridge and amplifier. A sample in a pipette 40 is injected through a mercury drop seal 41 into the acid. Released $CO_2$ is carried to the reaction chamber reacting with the LiOH to release heat, which is indicated as a change in the output of the amplifier. In one example which was carried out with the apparatus shown in FIG. 2, a flow of 2 nanoliters/sec. of $CO_2$ produced a 400 microvolt signal from a pair of 50 kilohm thermistors excited with 1 volt RMS at 500 HZ. A recorder 39 records the output of the amplifier 37.

It is thought that the invention and many of its attendant advantages will be understood from the foregoing description and it will be apparant that various changes may be made in the form, construction and arrangement of the parts without departing from the spirit and scope of the invention or sacrificing all of its material advantages, the forms hereinbefore described being merely preferred embodiments thereof.

It is claimed:

1. Apparatus for quantitatively determining the carbon dioxide content in a gas comprising:
   a. a sampling and separating means for selectively separating the carbon dioxide from any other components in said gas, b. a reactor vessel containing a basic material which is reactive with the separated carbon dioxide,
c. a thermopile for measuring the heat generated by the reaction of the carbon dioxide with the basic material, said thermopile being in thermal contact with the basic material, and
d. means for transporting the separated carbon dioxide from the sampling and separating means to the reactor vessel.

2. The apparatus of claim 1 wherein the sampling and separating means includes means for introducing a carrier gas and a porous membrane material through which carbon dioxide selectively diffuses from the gas being analyzed into said carrier gas.

3. The apparatus of claim 1 wherein the basic material is in the form of a solid.

4. The apparatus of claim 3 wherein the basic material is lithium hydroxide.

* * * * *